(No Model.)

H. W. NICHOLES.
PAN HOLDER AND LIFTER.

No. 572,815. Patented Dec. 8, 1896.

Witnesses.
Albert Popkins.

Inventor
Herbert W. Nicholes
By Matthews & Co
Attorneys

UNITED STATES PATENT OFFICE.

HERBERT WHITTER NICHOLES, OF MARIETTA, GEORGIA, ASSIGNOR OF TWO-THIRDS TO ROBERT N. HOLLAND AND WM. E. GILBERT, OF SAME PLACE.

PAN HOLDER AND LIFTER.

SPECIFICATION forming part of Letters Patent No. 572,815, dated December 8, 1896.

Application filed July 11, 1896. Serial No. 598,819. (No model.)

*To all whom it may concern:*

Be it known that I, HERBERT WHITTER NICHOLES, a citizen of the United States of America, residing in Marietta, Cobb county, Georgia, have invented a certain new and useful Combination Pan Holder and Lifter; and I do hereby declare the following to be a full, clear, and exact description of the invention, such as will enable others skilled in the art to which it appertains to make and use the same.

My invention relates to improvements in pan, plate, and stove-lid lifters, the object of the same being to provide an article of this description which will be simple and economical in construction and durable and efficient in use; and with these ends in view my invention consists in the certain features of construction and combinations of parts as will be hereinafter fully described, and pointed out in the claim.

Figure 1:
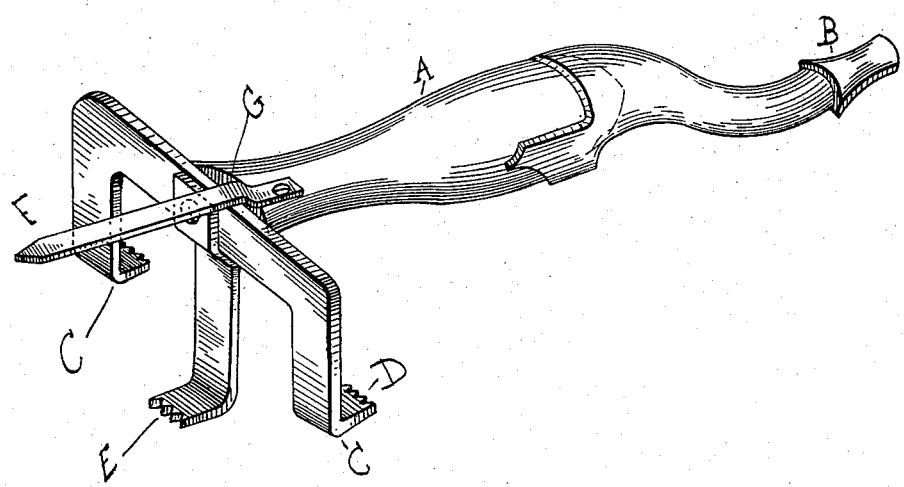
Figure 2:
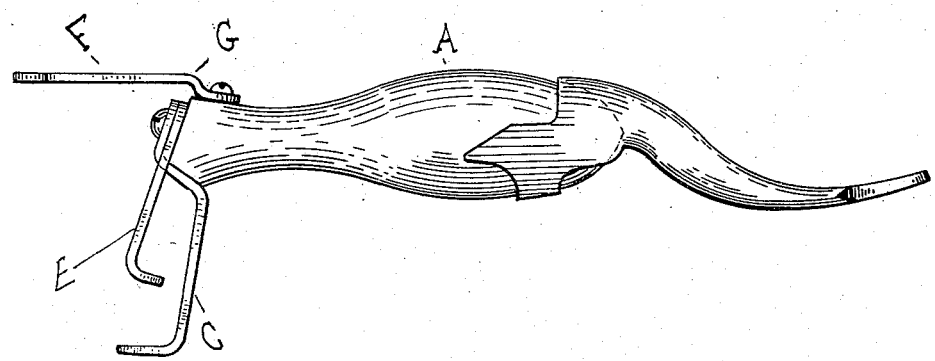

In the accompanying drawings, Figure 1 is a perspective view of my invention, and Fig. 2 is a side view thereof.

A represents the handle of the device, having the lid-lifter B secured on one end thereof. The opposite end of the handle is provided with two outside feet C, provided with inwardly-projecting claws D, and also with a central foot E, having outwardly-projecting claws. The handle is further provided with a longitudinal arm F, having the raised curve or shoulder G, leaving a space between the handle and the arm.

In operation when it is desired to raise a pan or other utensil the feet C are placed upon the outside thereof and the central foot E naturally engages the inside. Thus the utensil can readily be handled, and the claws will of course prevent them from slipping.

When it is desired to remove or replace a plate or any thin article, the handle is turned with the arm F underneath and the plate is placed between said arm and handle and may be easily carried from place to place.

Having thus fully described my invention, what I claim, and desire to secure by Letters Patent, is—

A combined pan, plate and stove-lid lifter consisting of the handle A, lifter B, feet C, and E and arm F, substantially as shown and described.

In testimony whereof I have affixed my signature in presence of two witnesses.

HERBERT WHITTER NICHOLES.

Witnesses:
 JOHN D. WHITE,
 W. R. MONTGOMERY.